US010147191B1

(12) United States Patent
Ribeiro et al.

(10) Patent No.: US 10,147,191 B1
(45) Date of Patent: Dec. 4, 2018

(54) PANORAMIC VIDEO CAMERAS, CAMERA SYSTEMS, AND METHODS THAT PROVIDE OBJECT TRACKING AND OBJECT BASED ZOOM

(71) Applicants: Claudio S. Ribeiro, Evanston, IL (US); Michael J. Harmon, Fort Lauderdale, FL (US); Felippe M. Bicudo, Fort Lauderdale, FL (US)

(72) Inventors: Claudio S. Ribeiro, Evanston, IL (US); Michael J. Harmon, Fort Lauderdale, FL (US); Felippe M. Bicudo, Fort Lauderdale, FL (US)

(73) Assignee: 360FLY, INC., Fort Lauderdale, FL (US)

( * ) Notice: Subject to any disclaimer, the term of this patent is extended or adjusted under 35 U.S.C. 154(b) by 16 days.

(21) Appl. No.: 15/219,632

(22) Filed: Jul. 26, 2016

(51) Int. Cl.
*H04N 5/32* (2006.01)
*G06T 7/00* (2017.01)
*H04N 5/232* (2006.01)

(52) U.S. Cl.
CPC ......... *G06T 7/004* (2013.01); *H04N 5/23238* (2013.01); *H04N 5/23296* (2013.01)

(58) Field of Classification Search
None
See application file for complete search history.

(56) References Cited

U.S. PATENT DOCUMENTS

| 2015/0254871 A1* | 9/2015 | MacMillan | H04N 21/233 382/180 |
| 2016/0307324 A1* | 10/2016 | Nakada | G06K 9/6215 |
| 2017/0255372 A1* | 9/2017 | Hsu | G06F 3/04847 |

* cited by examiner

*Primary Examiner* — Eileen M Adams
(74) *Attorney, Agent, or Firm* — Patents on Demand, Pa; Brian K. Buchheit

(57) ABSTRACT

A panoramic video camera includes a lens having a horizontal FOV portion of 360° about an optical axis. The panoramic video camera includes an image sensor, a processor, and a storage medium. The processor executes programmatic instructions to analyze digital image files to locate an object and positions thereof to produce object position data. Executed programmatic instructions also generate a plurality of zoom levels for the respective digital image files based on the object position data. The zoom levels enable a playback device to visually show the object at varying magnifications during playback of a video segment derived from the digital image files. Zoom levels may alter image capture settings of the panoramic video camera, may alter playback device playback settings, or both.

18 Claims, 7 Drawing Sheets

PANORAMIC VIDEO CAMERAS, CAMERA SYSTEMS, AND METHODS THAT PROVIDE OBJECT TRACKING AND OBJECT BASED ZOOM

BACKGROUND

The present invention relates generally to the field of image capture and, more particularly, to panoramic video cameras, camera systems, and methods that provide object tracking-based image capture and image zoom.

Panoramic video cameras are known to capture a field of view (FOV) of 360° about an optical axis of the lens or lenses used in the cameras. Such FOV is typically referred to as the "horizontal FOV" of the camera. Panoramic video cameras can also simultaneously capture an FOV about an axis orthogonal to the optical axis of the camera lens(es). This additional FOV is typically referred to as the "vertical FOV" of the camera. The vertical FOV may exceed 180° when the camera includes one or more ultra-wide angle lenses. The combination of the horizontal FOV and the vertical FOV provides the overall FOV of the panoramic video camera (e.g., 360°×180°, 360°×270°, and so forth). A wide overall FOV permits the camera to capture environmental information about a physical region surrounding the camera. Accordingly, a single panoramic video camera placed in the center of a meeting table is capable of capturing imagery for all participants sitting around the table.

One common use case for a panoramic video camera is to mount the camera on a moving object, such as a person, bicycle, or automobile, to capture imagery of an activity, such as skiing, surfing, bike riding, auto racing, and the like. A goal of such use is to permit playback of the captured video on a display that enables a viewer to become immersed in the experience. A user often is provided controls to alter a view of video playback, where the playback includes a relative center. That is, playback typically provides a horizontal FOV viewing segment of approximately 110° of an available 360° arc. For playback, a center for this viewing segment must be defined, which by default is typically a vector consistent with a relative motion of the camera itself.

Often, there is a desire for real-time or near real time playback (e.g., live streaming) of video from a panoramic video camera. This rapid response complicates intra-camera processing tremendously because it requires camera processor operations to be split between image capture and playback. To ensure effective end-user experiences at playback, some minimal overhead is necessary, which is often handled internally by camera hardware. For example, the horizontal FOV viewing segment for playback video is a sub-portion (e.g., 110° degree arc) of the horizontal FOV for the captured image content (e.g., 360° arc). Additionally, the horizontal FOV viewing segment boundaries may require adjusting to stabilize playback. That is, because the camera itself is in motion due to being mounted to a dynamically moving object, a smoothing function may need to be applied to compensate for camera based motion. Overall, processor intensive digital signal processing (DSP) operations must be minimized to minimize latency between video capture and playback.

Typical zoom functionality implemented for panoramic video cameras and playback systems relegate any zooming to a post-process (pre-playback) function controlled by a user playback interface. A user is presented with a zoom option, which alters playback magnification per user input. Software established digital zoom is a limited process practically constrained by a fidelity of image data contained in an underlying video segment. A balance of competing factors exists for optimal user experience regarding playback based zoom functionality. Video size is generally minimized to facilitate rapid transfer of video content and playback of the same, as the greater the size of a video segment file, the more resource consumption for transport and processing. To enable accurate zooming that does not rapidly pixelate upon magnification, a video segment file pixel density is increased to ensure. Sometimes, smoothing functions are implemented to add additional pixels not present in the file to improve appearance during zooming operations at an expense of accuracy and additional processing resources. Regardless of technology being implemented, a balance between competing interests occurs. Additionally, implementation of a manual zoom feature imposes a manual overhead on an end-user.

BRIEF DESCRIPTION OF THE DRAWINGS

In the accompanying figures like reference numerals refer to identical or functionally similar elements throughout the separate views, together with the detailed description below, and are incorporated in and form part of the specification to further illustrate embodiments of concepts that include the claimed invention and explain various principles and advantages of those embodiments.

Figure 1:
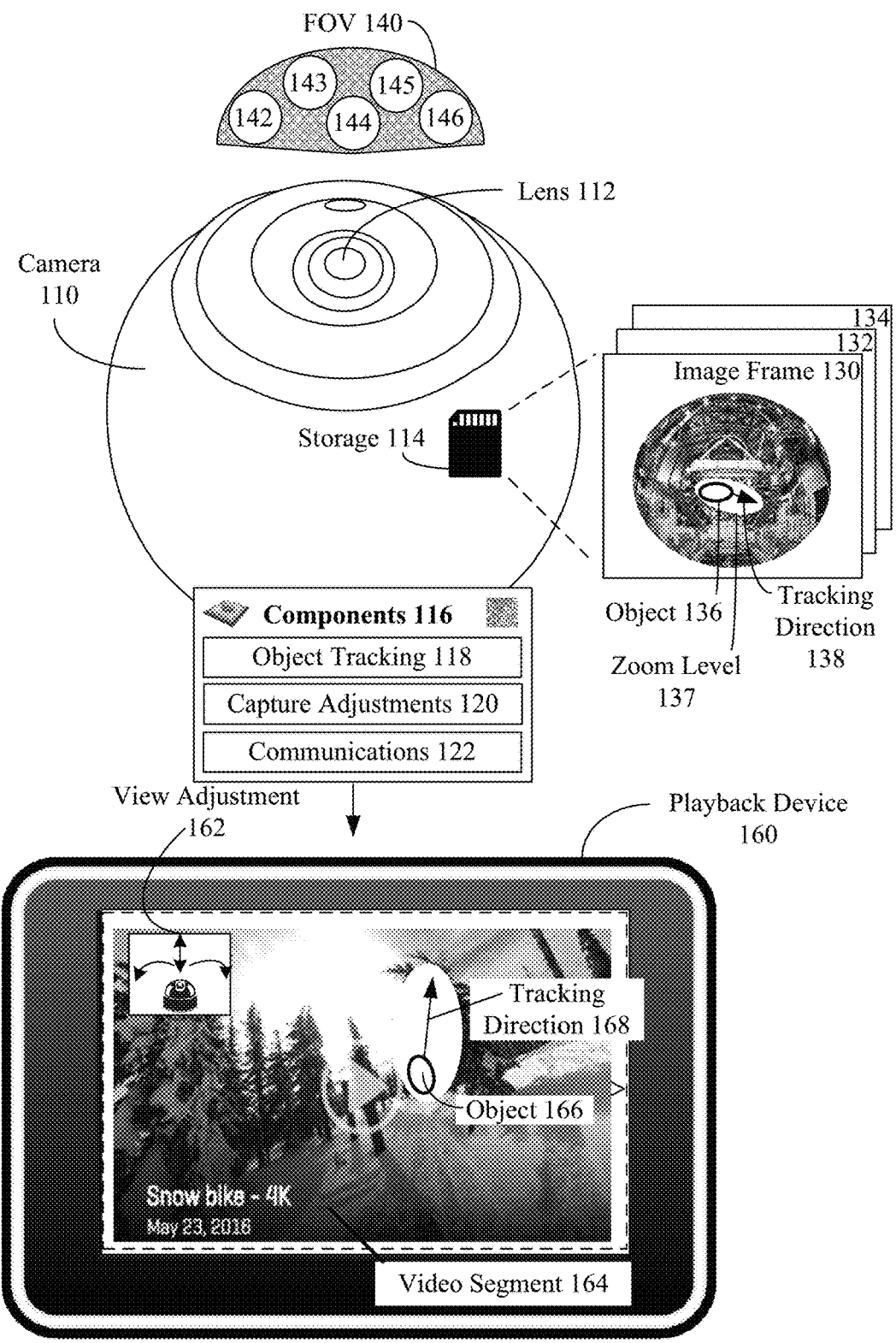
FIG. 1 shows a panoramic video camera with object tracking capabilities, in accordance with exemplary embodiments of the disclosure.

Those skilled in the field of the present disclosure will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. The details of well-known elements, structure, or processes that would be necessary to practice the embodiments, and that would be well known to those of skill in the art, are not necessarily shown and should be assumed to be present unless otherwise indicated.

DETAILED DESCRIPTION

The disclosure enables a panoramic video camera to identity and track objects visually contained within captured image content. As used herein and in the appended claims, the term "object" should be construed broadly to include animate and inanimate objects, including, but not limited to, people and things. As used herein and in the appended claims, the term "panoramic video camera" should be construed to include any electronic device having integrated or connected panoramic image capturing capability. A zoom level is applied to a position of the objects, which enables playback on a playback device to apply a magnification level based on the tracked object position within a scene. The panoramic video camera has a lens having a field of view (FOV) that includes a horizontal FOV portion and a vertical FOV portion. The horizontal FOV portion may be 360° about an optical axis of the lens. The vertical FOV portion may be any angle and is preferably in the range of 180° to 360°. Playback data is generated by the panoramic video camera and is time referenced to digital image files of a video segment. The playback data includes object position data, zoom level data, and other values (e.g., object direction data). The playback data enables a playback device separate from the panoramic video camera to adaptively orient and adaptively magnify images displayed during playback. Magnification is a non-manual process based on a determined size of a tracked object that varies in level over a time sequence of a video segment.

Playback within a playback device is often limited to a FOV, such as 110°, representing a sub portion of the horizontal FOV of the panoramic video camera. Digital image files used by the camera store image content for the entire 360° horizontal FOV, so the viewing segment represents a portion of the available data of a video segment presented during playback. The viewing segment during playback may be adjusted by a user interactive control and/or may be automatically adjusted per generated variable settings. A default viewing segment, as used herein, is one that follows an identified object when the playback device is set to an object tracking mode. The mode also enables dynamic magnification calculated to maximize viewing of a tracked object. Other modes may exist for a playback device.

In embodiments, the object being tracked lacks a physical sensor attached to the object, so that tracking occurs using visual information contained within image frames captured by the camera. Object tracking and zoom level may occur in real-time or near real-time as an intra-camera process. External devices, such as a playback device, may not incur processing overhead as received video content has already been adjusted by the camera to track a specified object. The playback device may receive playback data, which it uses to adjust playback to track an object in other implementations. In embodiments, a direction of the camera, when the camera is mounted to a dynamically moving object, is independent of a direction of the object being tracked. Multiple panoramic video cameras in a region may all track a common object. Playback may aggregate content from multiple difference sources, each tracking a common object. Source selection, when multiple sources are utilized may be automatically selected to providing an optimal viewing of the tracked object. Inter camera communications are contemplated in embodiments where source aggregation occurs.

To elaborate by example, a football game may be played where players have mounted panoramic video cameras mounted on helmets/gear. Activity for the football game is often centered on the ball, which is a dynamically moving object having movement independent of any of the players on the field. The object tracking and object magnification features described herein for the panoramic video camera permits player mounted cameras to "follow" the ball. A watcher, viewing the football game from a playback device is able to follow the ball from a perspective of one or more player mounted cameras regardless of player motion. As different players on the field periodically will lack a good view of the football (e.g., a player is tackled) different camera sources are able to be referenced/acquired automatically from a playback device and/or from the camera itself. A direction of the tracked object is necessary to enable playback adjustments, as it provides a common reference frame (that based on object motion) for following the object during playback.

Following motion of a dynamic object using panoramic video cameras is challenging for many reasons. Unlike stereoscopic vision (two human eyes), where depth is discernable, a panoramic video camera typically has a single lens, which is unable to discern depth. Further, use of an ultra-wide angle lens provides optical distortions (e.g., barrel distortions) within a captured curvilinear image file. Thus, a tracked object, such as a football, is not inherently represented/distinguishable based on depth, but instead must be distinguished from other object features contained within a distorted two-dimensional image file. Pixel based characteristics of objects are used to determine a region about the object to reasonably infer the object's existence. The object's position moves from image-frame to image frame (of a set of time sequenced image frames representing a video segment), which permits a discernment of motion. Thus, motion for purposes of object direction in embodiments of the disclosure is based on changes of pixels within curvilinear image files. In such embodiments, no mapping of three dimensional objects to a three dimensional space occurs, as such mappings are processor intensive and would introduce latencies inhibiting the real-time or near real time playback of video segments. The playback of video may be direct based on direct communications between a playback device and a camera. A network server may function as an intermediary between the camera(s) and the playback devices. When a network server is used, low latency between capture and playback may be a strong consideration limiting an amount of practical analysis or DSP manipulation that is possible/feasible.

In one illustrative embodiment of the disclosure, a panoramic video camera includes one or more ultra-wide lenses covering a field of view of 360° about a first axis and covering just about any angle (preferably at least 180°) about a second axis orthogonal to the first axis. That is, the camera includes a lens having a field of view (FOV) that includes a horizontal FOV portion and a vertical FOV portion. The horizontal FOV portion is 360° about an optical axis of the lens(es). The vertical FOV may be any angle and is preferably in the range of 180° to 360° about an axis orthogonal to the optical axis of the lens(es). The camera includes an image sensor for converting light passing through the ultra-wide lens into electronic signals as well as a non-transitory storage medium for storing digital image files constructed from the electronic signals. Each of the digital image files include image content captured for the ultra-wide lens. This image content is referred to herein as a digital image file. As used herein, the term file is not intended to be restricted to any specific file format and raw image data maintained in RAM is to be considered within scope of the term digital image file. A processor is included in the camera. The processor executes programmatic instructions stored as software or firmware within the camera. The camera includes an object identifier, which is a structure including a subset of the programmatic instructions executable by the processor. The object identifier analyzes pixels to locate a defined object based on the patterns of the pixels and compares these patterns to a predefined pixel pattern characteristic of the defined object. A direction handler of the camera is another structure that includes another subset of the programmatic instructions. The direction handler determines a vector of movement of the defined object based on a shifting position of pixel patterns present in a time sequence. Capture adjustments may be implemented that alter capture parameters of the camera based on an altered zoom level. Capture adjustments may include optical zoom adjustments as well as adjustments to raw image data capture during an analog to digital conversion stage. Object position data, object magnification, and object direction data are both considered data elements of playback data generated by the camera. This playback data is used to generate video segments for playback, which follows motion of a tracked object.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction processing system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction processing system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows a panoramic video camera 110 with object tracking capabilities, in accordance with exemplary embodiments of the disclosure. The camera 110 is enabled for real-time playback in embodiments (and of near-real time playback in others), where captured images are digitally conveyed via an internal transmitter to a receiver of playback device 160. Object tracking capabilities refers to an ability to define an object, which is tracked by the camera 110 and utilized for centering a playback frame (e.g., a viewing segment) of captured video. In a football example used throughout the disclosure, the object being tracked is a football, such that the camera 110 "follows" the football as it moves relative to a position of the camera 110 itself. Playback of a resulting video segment effectively centers action of the video segment on the object being tracked (e.g., the football). Magnification adjustments centered on the football dynamically occur as the tracked object is followed. The football example is used for simplicity/clarity of expression and any discernable object able to be captured within a series of image frames is able to be tracked per the tracking capabilities detailed herein.

Camera 110 is a panoramic video camera that has one or more lenses 112, each of which captures a field of view (FOV) 140 of 360°. Captured images, also referred to as digital image files, are internally stored in storage medium 114 as a set of image frames 130, 132, 134. The set of frames (130-134) are time sequenced such that together they form a video segment in one embodiment. This video segment is playable on a display of playback device 160. The images captured in each image frame 130-134 may be curvilinear images subject to optical distortions (i.e., barrel distortions) characteristic of an ultra-wide angle lens. The distortions of stored image frames 130-136 may be rectilinear-corrected by software/firmware before playback on playback device 160. Playback device 160 is presumed to present a viewing FOV (such as 110°), which is a sub portion of the horizontal FOV (such as 360°) accessible from content stored in the digital image files. The viewing section shown during playback ism therefore, a bound sub-area of the image frame 130-134. Other portions of the image frame 130-134 are hidden from view during playback. In one embodiment, an interactive view adjustment control 162 is provided that permits a user to adjust the viewing section of playback video, which changes the bound sub-areas of the image frame shown in the display of the playback device 160.

Components 116 of camera 110 enable an object tracking 118 function, which identifies and locates one or more objects 136 within an image frame 130. The tracked object 136 is presumed to be moving relative to a position of the camera 110, which results in a tracking direction 138. From one time sequenced frame to another (e.g., frames 130-134), a relative position of the object 136 being tracked will move within the image frame. As the object 136 moves within the image frame 130, an image section (e.g., a viewing segment) used for playback also moves correspondingly. From a playback perspective, a tracking direction 168 (consistent with tracking direction 138) can be used for different perspective viewing.

A zoom level 137 is a parameter representing a magnification applied to a region of an image frame 130 about object 136. The magnification level, in one embodiment, is applied to the image frame 130 itself so that content of the entire image frame 130 has the increased/decreased magnification consistent with the zoom level 137. In another embodiment, the content of image frame 130 is unchanged by the zoom level 137, which is used to alter playback of video segment 164, by increasing/decreasing a magnification level of a viewing region. Both image data and viewing region adjustments may occur in embodiments. Zoom level 137 is calculated to ensure a maximum viewing experience of object 136. For fast moving objects (per tracking direction 138 and per a corresponding velocity vector), a zoom level 137 may optimally decrease magnification to minimize scene jarring and to ensure a viewer is able to track object motion from one point to another easily. For slower moving objects, an increased zoom level 137 may be appropriate. Rules based settings specific to different object domains may alter programmatic determinations with regard to an optimal zoom level for a given situation.

The tracking direction 138 is a spatial pointer representing a movement of the object 136 over time (e.g., from frame-to-frame of image frames 130-134). From a playback perspective, a tracking direction 168 (consistent with tracking direction 138) can be used for different perspective viewing. From a perspective of the moving and tracked object 136, 166, for example, a forward motion "into" the display screen can be shown. This is often referred to as a first-person perspective view. Different views and/or perspectives are adjustable for playback depending on user preference. Adjusting such views may be dependent on the tracking direction 138, which is defined in object tracking data. Object tracking data is incorporated into playback data along with object position data. The playback data is defined and digitally transmitted by camera 110 along with the image frames 130. Playback device 160 is able to "center" the viewing segment upon the object 166 so that it is within a central region of the viewing segment. An equivalent object 136 is not generally centered within the image frame 130, as its position relative to the image frame 130 is dependent upon a portion of the camera 110 in the real world relative to a real world moving object. Object tracking component 118 attempts to identity a pixel region of the curvilinear image (or rectolinear image derived from the curvilinear one) for the real world object based on definable visual object characteristics.

In one embodiment, object tracking 118 is utilized during an image capture stage and/or image frame recording stage to make adjustments based on a position of the object 136. These adjustments include optical adjustments of the camera 110, such as aperture, digital shutter settings, optical zoom/optical focus adjustments. Changes in optical settings of a camera 110 alter content of light directed through the camera 110 that strikes a surface of the camera's digital image sensor. Object tracking component 118 enables adjustments in optical components based on a position of a tracked physical object. Not all embodiments of camera 110 include optical adjustment settings.

Other contemplated embodiments adjust settings altering how light striking the image sensor is interpreted when creating the image frame 130. For example, field programmable gate arrays (FPGAs) may be used for digital signal processing (DSP) received input signals. Settings applicable to FPGSs include gain, gamma, area of interest, binning/subsampling, pixel clock adjustments, offset, triggering, etc. These settings affect brightness, contrast, saturation, and sharpness of images. The process of digitally recording image data necessarily represents a loss in the respective analog content of the light striking the image sensor, and the settings performed as capture adjustments represents a manner to bias this loss; to optimize resultant digital image clarity. Trade-offs are involved, which is particularly challenging for images obtained from ultra-wide angle lenses. For example, an upwardly pointing panoramic video camera 110 if positioned outdoors will often have an exposed view of the sun. Other portions captured within the FOV 140 will likely be portions of an image defined by heavy shade (e.g., outside of direct sunlight). Often, different sensor regions (shown as FOV 142, 143, 144, 145, and 146) will be defined by the physical camera sensors. A decision regarding which one of these regions is used for adjusting camera properties/image capture settings is a decision that has a dramatic effect on digital content of image frame 130. At object capture time, settings within a region (142-146) that corresponds to the object 136 being tracked are used to bias the settings for image capture, which affects brightness, contrast, saturation, and sharpness of the image 136. No known panoramic video camera determines image capture settings based on a position of a tracked object relative to sensor regions 142-146. These capture settings, which affect data recorded for the raw image frame 130 directly from an image sensor based on light striking the image sensor is different from post-processing solutions. That is, a time of initial digital data recording defines a quality/accuracy maximum. With digital images, characteristics can be altered as post-processing changes, but each such post-processing operation represents a fidelity loss; where loss increases for each DSP operation performed. These post-process losses are avoided by making adjustments based on object tracking at the time that the original digital data is first recorded as an image frame 130-134.

Figure 2A:
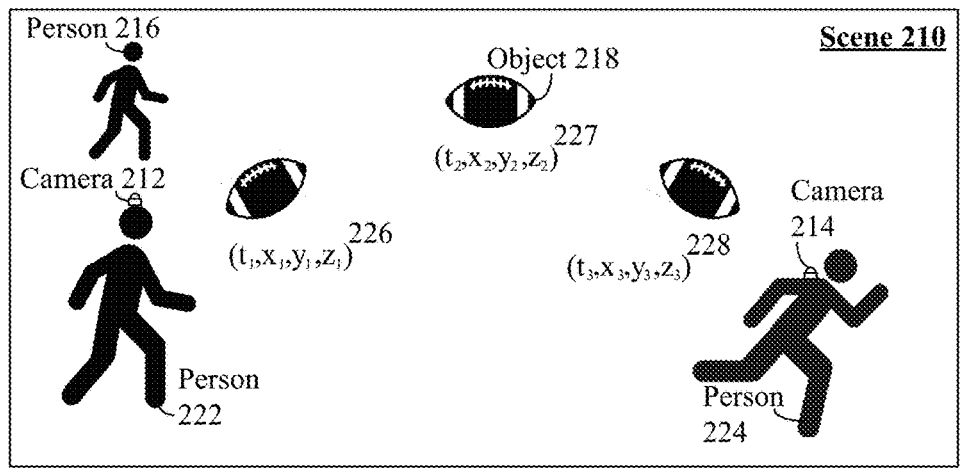
FIG. 2A shows a use case scenario for object tracking using a panoramic video camera.

FIG. 2A shows a use case scenario for object tracking using a panoramic video camera. Scene 210 shows a first person 222 throwing a football (i.e., one embodiment of object 218) to a second person 224. A third person 216 is shown (e.g., a blocker) being positioned proximate to the quarterback (football thrower 222). Person 216 is shown for distance perspective from camera 212, as the wearer of camera 212 is not within the FOV of this camera 222. The football spatially moves within three dimensional space over a sequence of time. Three time and position points are referenced as points 226, 227, and 228. Points 226, 227, 228 are labeled with variables for time and space, which are listed for reference purposes as $(t_1, x_1, y_1, z_1)$, $(t_2, x_2, y_2, z_2)$, $(t_3, x_3, y_3, z_3)$, respectively. Accordingly, a first, second, and third time for football positions are shown as $t_1$, $t_2$, and $t_3$. For $t_1$, a position of the football is shown as being at point $x_1, y_1, z_1$. For $t_2$ the position of the football is shown as being at $x_2, y_2, t_2$. For $t_3$, the position of the football is shown as being at $x_3, y_3$, and $z_3$.

The first person 222, as shown, is assumed to have a wearable panoramic video camera attached to a helmet/hat. The second person 224 has a wearable panoramic video camera 214 attached to a shoulder board/jersey. The position of the cameras 212, 214 relative to the person 222, 224 is immaterial, as different mounts and positioning for the cameras 212, 214 are contemplated. Of significance is that the respective cameras 212, 214 move responsive to movement of each person 222, 224, which alters imagery being captured. In the shown embodiment, tracking a moving object 218, such as a football, requires one, two, or more cameras subject to dynamic movement (movement of person 222 and of person 224, respectively) to be considered. Embodiments are contemplated where the camera 212, 214 is within a relatively stationary position, which is a simplified use case over what is detailed in FIG. 2. Cameras 212, 214 have position determining sensors embedded within, such as Global Positioning System (GPS) sensors, in one embodiment, which simplifies acquiring data for camera 212, 214 movements in space.

Figure 2B:
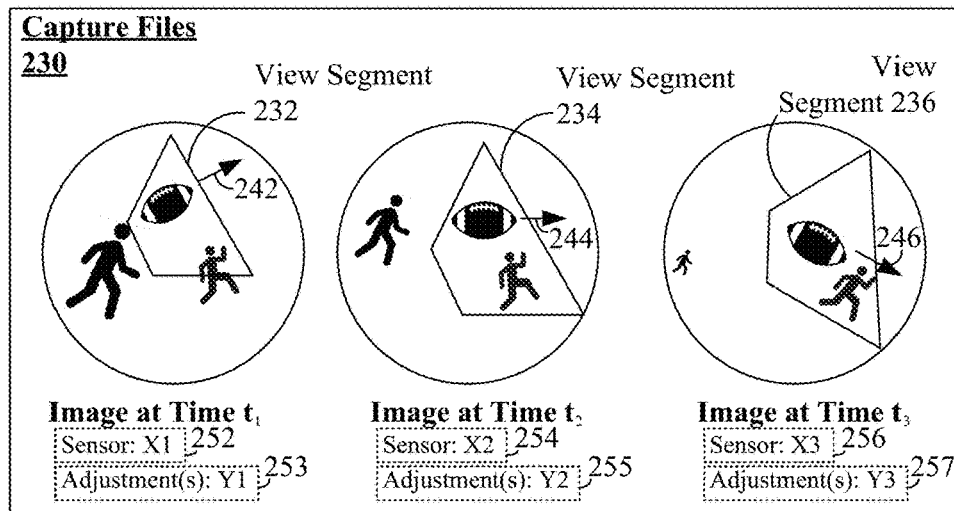
FIG. 2B shows a set of exemplary image capture files for the use case scenario of FIG. 2A.

The capture files section 230 of FIG. 2B shows a set of image frames captured by the first camera. These image frames are taken at $t_1$, $t_2$, and $t_3$ respectively, and are curvilinear image frames subject to barrel distortions from an ultra-wide angle lens. This is not a limitation of the disclosure's scope, and other storage methodologies, such as storing a DSP adjusted rectrolinear image file are contemplated herein. As shown, each digital stored file is captured from the camera 212 attached to person 222, so that a body of person 222, presumed to be outside the FOV of camera 212, is not shown. What is shown in each of the three image files is a body of person 216 (e.g., a line man) presumed to be proximate to person 222. Other objects shown in the simplified illustration include the body of person 224 and the football, which is object 218. Viewing segments 232, 234, and 236 are shown as a trapezoid shape(s) within the curvilinear image frame. The trapezoid shape represents that a portion of a distorted curvilinear image used to create a rectangular region for playback (262, 264, and 266). This shape is not that of a rectangular region due to the distortions inherent in the curvilinear image. The trapezoid shape is a rough approximation of shape used in a real-world situation. A mapping of distortion verses location within the raw image data/file is necessary in practice. Defining a mathematical matrix mapped to the distortion properties of the lens (where the matrix is used as a transform in a linear algebra equation) is a relatively trivial operation well within the level of ordinary skill, which is not elaborated herein for this reason.

For each image file, FIG. 2B shows a sensor (corresponding to one of the sensor regions 142-146) that is relied upon for camera adjustments. The sensor used is based on which sensor region 142-146 the tracked object 218 is within. In one embodiment, one of the multiple sensors (each associated with one of regions 142-146) may not be used exclusively, but may be weighed against input from other sensors. This permits biasing of capture characteristics towards a specific sensor (or set of sensors) relative to others, as opposed to exclusively relying on a subset of sensors for adjustments.

Sensor regions 142-146, for the respective sensors, are able to be mapped to portions of the curvilinear regions based on lens distortion properties. The tracked object 218 is identifiable by pixel characteristics associated of the object as discernable from the capture files 230. Given environmental readings picked up by the selective sensor, a number of values for image capture adjustments 253 are specified. The present invention is distinctive from many conventional systems; as multiple different regions are present due to the 360° FOV. No known conventional system utilizes object tracking within a panoramic video camera to alter a subset of sensors are to be relied upon for making capture adjustments. These adjustments greatly improve resultant images produced.

To illustrate by use-case for clarity, a football (the object being tracked) can travel from a relatively shaded area (at $t_1$), to an area with an extremely bright background (at $t_2$, due to the sun), to an area between these two extremes (at $t_3$). The camera's image files 230 covers an entirety of this range of significant brightness variations. The adjustments "optimal" for playback based on the region surrounding the object. That is, the view segment 232, 234, 236 is a default playback region 260, and the optical and digital adjustments (e.g., capture adjustments 120) are focused on this region. For example, magnification changes focused on object 218 alter regional boundaries of view segment 232, 234, and 236. Decreasing the boundaries (area within the boundaries) of segment 232, 234, 236 makes a viewing region during playback 262, 264, 266 relatively larger or increases magnification. Increasing the boundaries for segment 232, 234, 236 makes a viewing region during playback 262, 264, 266 relatively smaller or decreases magnification. Some post processing adjustments are still possible and appropriate, such as when a view adjustment 162 is made to alter a viewing segment seen during playback. Such DSP adjustments are always lossy, relative to a clarity of the stored image file being DSP modified. Initial setting optimization (by determining sensor 252, 254, 256) and adjustments 253, 255, 257 are significant for maximizing image quality and viewer experience given hardware constraints of a camera 212, 214 and inherent DSP losses.

The playback view 260 shows different frames 262, 264, 266 of a video segment, which correspond to viewing segments 232, 234, and 236, respectively. A playback time 271 of frame 262 corresponds to $t_1$; a playback time 272 of frame 264 corresponds to $t_2$; a playback time 273 of frame 266 corresponds to $t_3$. For each video frame 262, 264, 266, a playback perspective 281, 283, and 285 is established. As shown, a third-person perspective view is selected, as opposed to a first-person view illustrated for video segment 164 of FIG. 1. The perspective or play mode (281-283) is an adjustable setting/parameter for a playback interface in contemplated embodiments. Adjustments are dependent upon the object motion vector 263, 265, 267 established for the frames 262, 264, 266. The object motion vectors are based on the object direction 242, 244, and 246 for the corresponding image files. Smoothing functions are able to be implemented to maximize smooth playback. Additionally, image stabilization (given that movement of camera 212 is anticipated since it is mounted on a moving person 222) is enabled by altering the view segment 232 to compensate for motion. Motion sensors present within the camera 212, 214 are able to be leveraged when making such corrections.

Figure 2C:
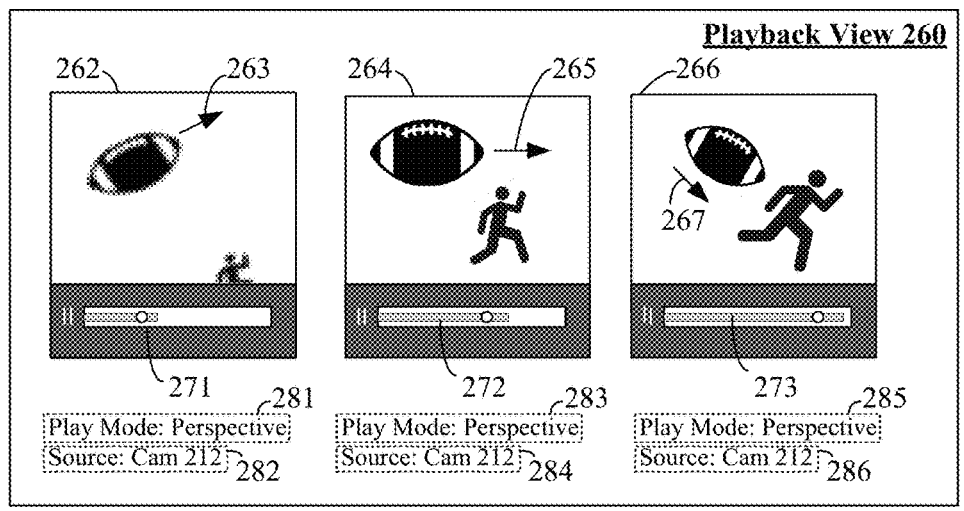
FIG. 2C shows a set of exemplary video segment playback frames for the use case scenario of FIG. 2A.
Figure 3A:
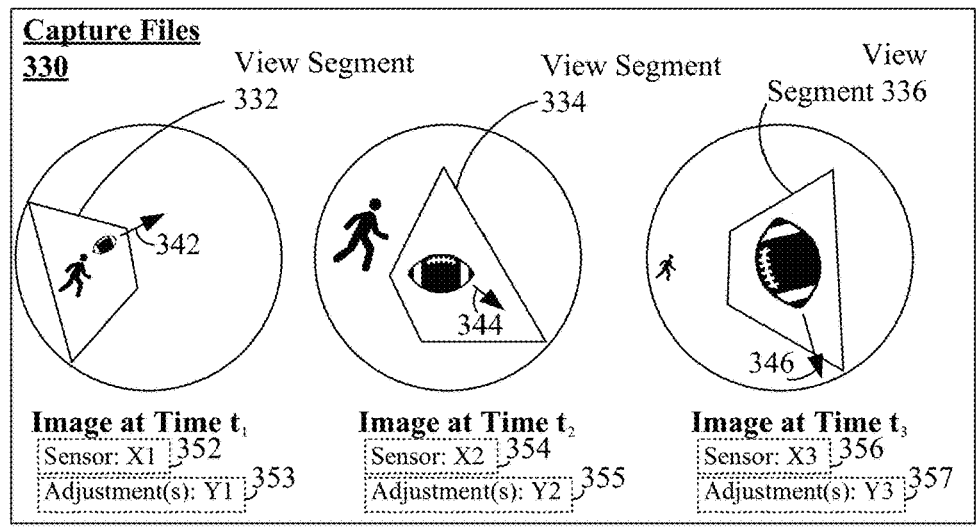
FIG. 3A shows a set of exemplary image capture files from a second panoramic video camera for the use case scenario of FIG. 2A.
Figure 3B:
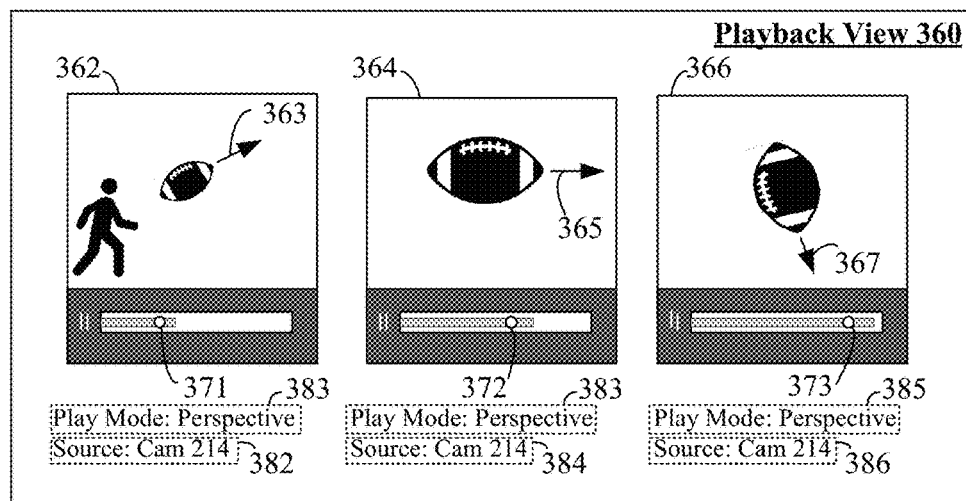
FIG. 3B shows a set of exemplary video segment playback frames for the use case scenario of FIG. 2A, where the frames were captured using the second camera.

While playback view 260 shown in FIG. 2C is limited to using images from a single source 282, 284, 286, the disclosure is not so limited. As illustrated by FIG. 3A, capture files 330 from camera 214 at $t_1$, $t_2$, and $t_3$ also exist. It is presumed that camera 214 is enabled for object tracking functions targeting the same object 218 (e.g., the football). Camera 214 also determines sensors 352, 254, 256 corresponding to regions 142-146 within which the football is located, which is used for capture adjustments 353, 355, 357. Image files 330 define view segments 332, 334, 336 and object tracking directions 342, 344, 346. View segments for camera 214 and the respective object magnification parameters (e.g., zoom level) and tracking directions will vary from those of camera 212. A playback view 360 for camera 214 includes frames 362, 364, 366 that correspond to image files.

Playback view 290, shows a playback video that includes frames from different cameras. Specifically, playback view uses frames 362, 364, and 366 from cameras 212 and 214. It is presumed for this example, that frame 264/364 represents a cross-over point; before which frames/image files from camera 212 are used, and after which frames from camera 214 are used. Altering sources during video playback can occur in real-time/near-real time as part of object tracking mode in contemplated embodiments. That is, since multiple cameras track the same object, the playback video can be constructed to utilize a "best" camera for following the object. Although two cameras are shown in the example, any number of cameras (one to an arbitrary large number) can be utilized when this feature is enabled.

Determinations of the "best" camera, can be based on a number of quantifiable parameters, such as object size within a file, object direction (i.e., where camera perspective is changed when the directional tracking deviates past a threshold), viewer preference (specifying a set of "people" to be followed/preferred while object tracking), and the like. To illustrate by an example dependent on object size, a relative size of object 218 within capture files 230 varies over time. Specifically, as the football moves away from the quarterback, the region of the image file that represents the football continuously diminishes or gets smaller. This diminishment can be somewhat compensated for though use of an optical zoom, if such is available within the feature set of camera 212. Diminishing of size is a function of physics as the football's position moves away from the camera 212. Given that person 224 is dynamically in motion, presumably in motion having an average vector similar to that of the football, but at a diminished velocity to that of the football (e.g., person 224 is catches the football after moving to get away from a defender), the relative size of the football to camera 214 increases between $t_1$ and $t_3$. Generally, the increase does not occur in a perfectly linear manner. Cameras 212 and 214 can communicate with each other over a control channel and can convey a relative size of the tracked object as captured by that camera. When a continuously diminishing size of the object (from camera 212's capture) crosses a threshold such that the football is larger and easier to discern from a perspective of camera 214, the playback can cross over; switching from camera 212 to camera 214.

Switching between sources, may rely at least in part, on the defined object directions 242, 244, 246, 342, 344, 346 of the respective image files. When a cross over happens, it is anticipated that a vector of playback will be altered 180° degrees in the football example. That is, first a user views the football traveling away from a quarterback. After the cross over point, the football is viewed as traveling towards the receiver. Regardless of specifics, objet direction 242, 244, 246, 342, 344, 346 is essential for making these adjustments to user experience. No conventional panoramic video camera outside this disclosure is known to track object position or to determine an object direction.

Figure 4:
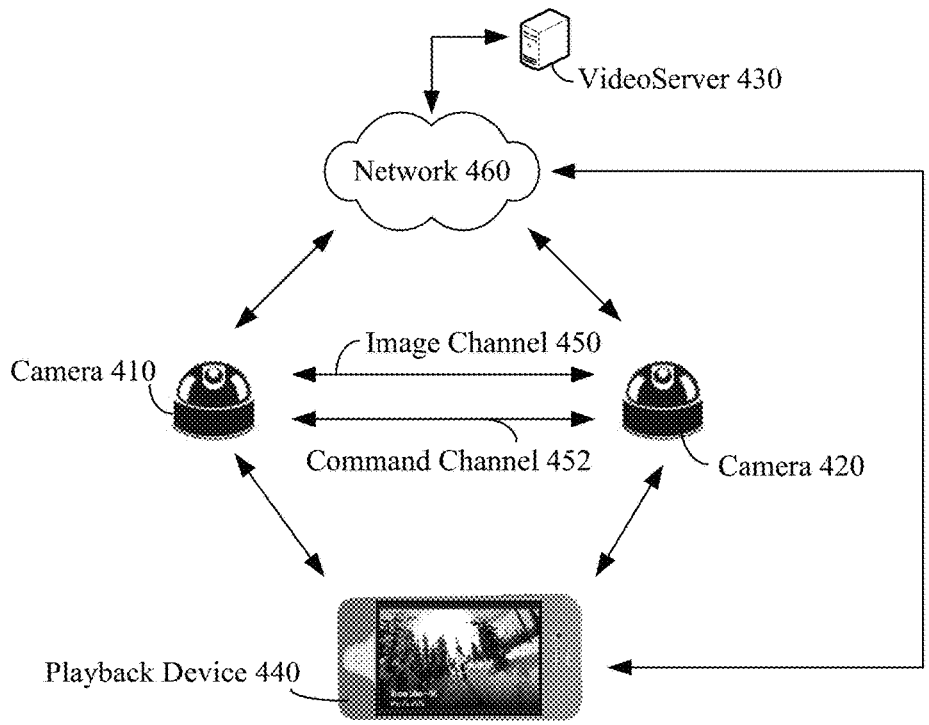
FIG. 4 shows communications occurring between two different panoramic video cameras, a video server, and a playback device in accordance with exemplary embodiments of the disclosure.

FIG. 4 shows communications occurring between two different panoramic video cameras 410, 420, a video server 430, and a playback device 440 in accordance with embodiments of the disclosure. Each camera 410, 420 utilizes a command channel 452 to exchange non-image information, such as commands, status, mode information, and playback data (including object position, zoom level, and/or object direction) between each other. The command channel 452 can exist within a personal area network (PAN), an ad hoc network, and/or mesh network formed by interconnecting a number of proximate cameras. A direct communication channel (e.g., BLUETOOTH pairing) also exists between the cameras. The command channel 452 passes requests and responses to change a video source of a tracked object in embodiments. Other information able to be passed over command channel 452 include, object tracking profiles, camera sensor information used for direction refinements when determining tracked object direction, and other such information. The command channel 452 in embodiments is an encrypted channel.

Two different approaches are taken for communicating image information and/or video information between cameras 410, 420 depending on design considerations. In one embodiment, imagery is communicated from each camera

Figure 3C:
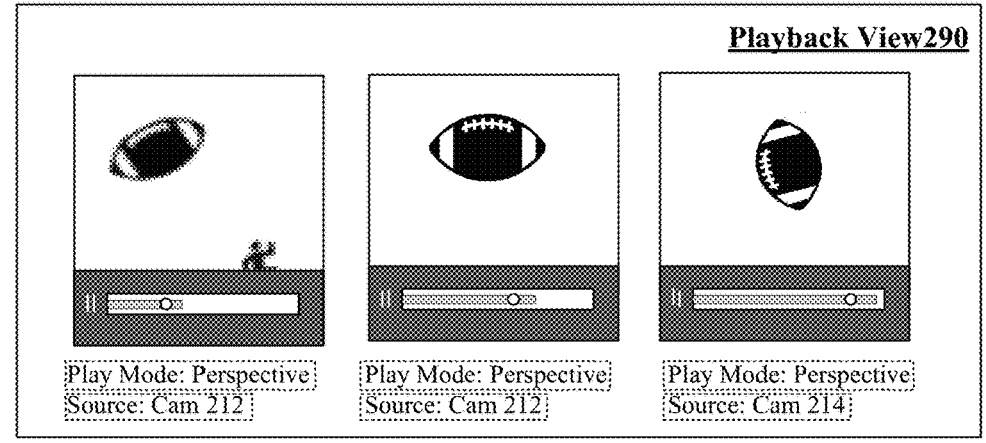
FIG. 3C shows a set of exemplary video segment playback frames for the use case scenario of FIG. 2A, which combine content from two different panoramic video cameras.

410, 420 to a video server 430 over network 460. Thus, if a video segment (or an image) is to be conveyed between camera 410 and camera 420, it is first be uploaded to video server 430 and subsequently downloaded to camera 420. In embodiments, multi-sourced video, such as that shown in FIG. 3C, is stored within the camera 410. Thus, a video file linked to object tracking may include video portions from remotely located cameras in addition to video portions captured by that camera 410. In other embodiments, aggregation of video from multiple sources occurs within video server 430. Information for altering video sources at specific video time segments may be recorded, such as through pointers or metadata, by one or more of the cameras 410, 420 in embodiments. This information is conveyed between cameras 410, 420 over command channel 452, is recorded as metadata in a stored video file, and/or is conveyed to video server 430 from the respective cameras 410, 420.

Use of video server 430, in embodiments, enables playback devices, such as device 440, to receive video directly from a network 460 connected source. Given that video conveyance is bandwidth intensive, use of video server 430 as a centralized video hub minimizes an amount of aggregate video traffic between cameras/playback devices. Even in embodiments, where video is generally uploaded/downloaded to video server 430, a limited amount of image conveyances can still occur over image channel 450. For example, key image snapshots or frames are conveyed between cameras over image channel 450 in order to permit an end user (accessing the image frames via a playback device 440 or camera controlling GUI) to make source decisions. For example, in one contemplated embodiment, a user can "hop" ahead in a given direction from one camera to another (in series) to object images out of the line of sight of a reference camera 410. Thus, a playback device 440 paired to a specific camera 410 has an expanded "line of sight" that includes that of any camera 410, 420 within a geo-boundary based on the reference camera's position.

In one embodiment, no video server 430 is needed, which is convenient/necessary in locations lacking strong network connectively. In such embodiments, image channel 450 is used to convey video between the different cameras 410 and 420. A direct communication between one or more of the cameras 410, 420 and playback device 440 enables real-time playback. Use of the image channel 450 and local direct communications with playback device 440 also minimizes costs when network connections are metered and charges are incurred based on usage. In some embodiments, the playback device 440 is located proximate to the camera 410 and functions as a user interface that controls functions of that specific camera. For example, playback device 440 is an embedded control screen of a car that is communicatively connected (either wirelessly or via internal wireless of a vehicle's electronic communication system) to a car mounted camera. In other embodiments, the playback device 440 can be a remote device (e.g., a user phone or tablet) used to access camera feeds. Thus, watchers of a football event (including local high-school events that may lack a network-based server 430) can watch views of a football event using their phones/tablets; where the views are provided from player mounted cameras.

Network 460 includes any hardware/software/and firmware necessary to convey data encoded within carrier waves. Data is contained within analog or digital signals and conveyed though data or voice channels. Network 460 includes local components and data pathways necessary for communications to be exchanged among computing device components and between integrated device components and peripheral devices. Network 460 also includes network equipment, such as routers, data lines, hubs, and intermediary servers which together form a data network, such as the Internet. Network 460 can also include circuit-based communication components, mobile communication components, telephony switches, modems, cellular communication towers, and the like. Network 460 includes line based and/or wireless communication pathways. In one embodiment, network 460 includes a mobile telephony communication network, with which a mobile network transceiver of the cameras 410, 420 communicate. Such a mobile network transceiver can conform to a variety of standards including, but not limited to standards defined for Global System for Mobile Communications (GSM), Long Term Evolution (LTE), 3rd Generation Partnership Project (3GPP), Code Division Multiple Access (CDMA), Time Division Multiple Access (TDMA), WiMAX (Worldwide Interoperability for Microwave Access), a wireless wide area network (WAN), or a wireless metropolitan area network (MAN). In one embodiment, the network 460 includes a local hub linked to a network backbone (internet/intranet); where the camera 410, 420 communicates with the local hub via a compatible local network transceiver. The local network transceiver conforms to a variety of standards including, but not limited to, WIFI (based on the Institute of Electrical and Electronics Engineers' (IEEE) 802.11 standards), BLUETOOTH, WIRELESS USB, Wireless Local Area Network (WLAN) standards, wireless Personal Area Network (PAN) standards, and the like.

Figure 5:
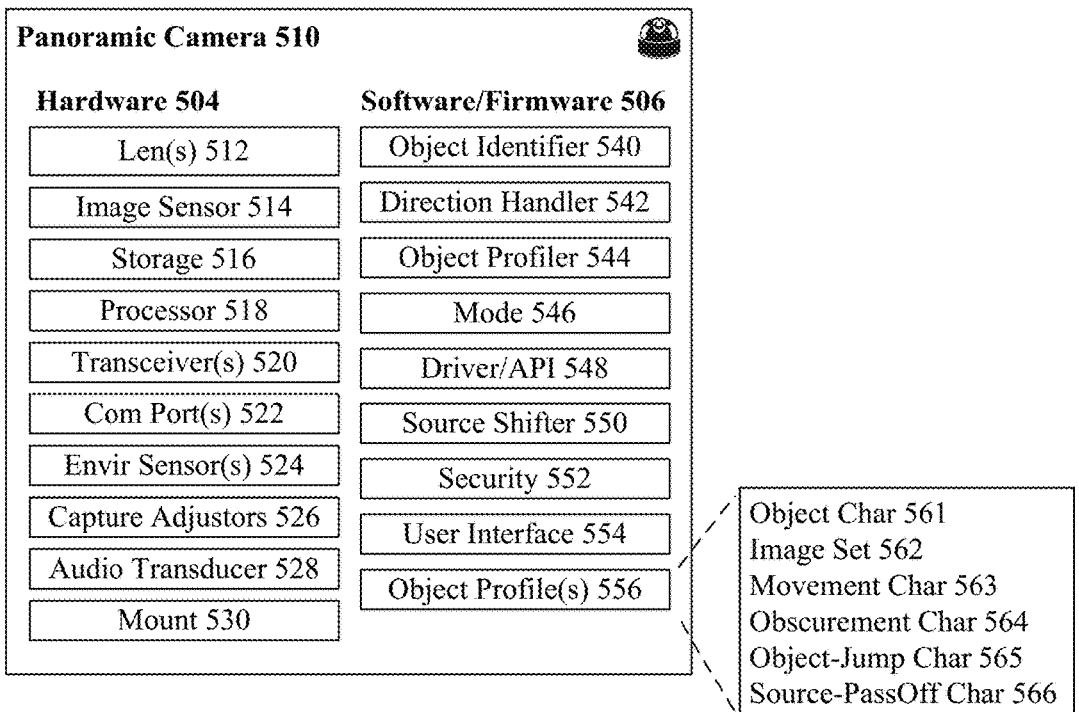
FIG. 5 shows a block diagram of a panoramic video camera having object tracking capabilities in accordance with embodiments of the disclosure.

FIG. 5 shows a diagram of a panoramic video camera 510 having object tracking capabilities in accordance with embodiments of the disclosure. Camera 510 includes hardware 504 and software/firmware 506. Configurations of camera 510 lacking a portion of the shown components and/or including components ones are contemplated herein to an extent the camera is able to perform the functions detailed for relevant embodiments.

As shown, hardware 504 includes lens 512, image sensor 514, storage 516, processor 518, transceiver 520, communication port(s) 522, environmental sensor(s) 524, capture adjustors 526, audio transducer 528, and mount 530.

Lens 502 is an assembly of optical components that direct environmental light to a surface of image sensor 514. Lens 502 is an ultra-wide angle lens able to cover a field of view of 360° about a first axis and able to cover at least 180° about a second axis orthogonal to the first axis. Lens 502 is able to be implemented as single lens, or as a sequence of multiple optical lenses. Light is directed and focused by lens 502 upon the surface of image sensor 514. In one embodiment, lens 502 inherently distorts light resulting in a deviation from a rectilinear projection. A rectilinear projection is one in which straight lines in a scene remain straight in an image. The distortion of lens 502 is a curvilinear barrel distortion in embodiments. In a curvilinear barrel distortion, image magnification decreases with distance from the optical axis. The apparent effect is that of an image which has been mapped around a sphere or barrel.

Image sensor 514 is a hardware component that converting light striking a surface of the sensor into electronic signals. The light converted into signals includes that of the visible light spectrum, as well as infrared and ultraviolent in embodiments. Sensor 514 is implemented in embodiments as a complementary metal-oxide-semiconductor (CMOS) or a charge-coupled device (CCD) image sensor, although other types of image sensors are to be considered within scope of the disclosure.

Storage 516 is a non-transitory storage medium for storing digital image files constructed from the electronic signals generated by the image sensor 514. Storage 516 also stores programmatic instructions of the software/firmware 506. Storage 516 can include a removable non-volatile memory card, such as a secure digital (SD) card or other flash memory artifact. Flash memory refers to an electronic (solid-state) non-volatile storage medium able to be electronically erased and reprogrammed. Storage 516 also includes read only memory (ROM) structures, which store programmed instructions of firmware in embodiments. Storage 516 includes random access memory (RAM) in embodiments. Storage 516 is not limited to any specific storage technology and magnetic disk mediums, optical disk mediums, semiconductor memories, digitally encoded plastic memories, holographic memories, and the like are contemplated. Storage 516 is a non-transitory storage medium, which excludes carrier waves, signal mediums, and other forms of energy. Within storage 516 data is able to be stored in a variety of manners. For example, data can be stored within a database structure, within one or more digital files of a file storage system. Each file may or may not be indexed for data searching purposes. Further, storage 516 may utilize one or more encryption mechanisms to protect stored data from unauthorized access.

Processor 518 is a hardware component for executing programmatic instructions stored as software or firmware (506). Processor 518 refers to a central processor unit that is hardware that carries out instructions by performing arithmetical, logical, and input/output operations. The processor 518 is a single core or a multicore processing unit. Processor 518 is implemented as a microprocessor that incorporates the camera's central processing unit (CPU) onto an integrated circuit (IC). Processor 518 includes an arithmetic logic unit (ALU), a digital signal processor (DSP) and/or a specialized unit for video processing in embodiments.

The one or more transceivers 520 are each a component able to transmit and receive data. The transceiver 520 includes at least one wireless transceiver, although one or more wired transceivers are also contemplated as being integrated. Multiple different transceivers supporting multiple different standards and communication channels are contemplated for camera 510. For example, a BLUETOOTH or WIFI transceiver is included in embodiments for inter-camera communications over command channel 452 or image channel 450. The transceiver 520 can be replaced by a transmitter and receiver (each a discrete component) in embodiments. A mobile telephony transceiver is included for communications with network 460 in embodiments.

Communication ports 522 represent one or more endpoints of communication linked to an operating system of camera 510. Communication ports 522 are used for transport layer protocol (TCP) and user datagram protocol (UPD) communications. One or more specialized communication ports 522 exist in embodiments for command channel 452 communications. These command channel 452 ports are secure ports requiring authentication from another approved camera, such as a camera having components and functionality consistent with camera 510. For example, one communication port 522 is able to be used for submitted requests and responses between cameras 410, 412 for coordinating object tracking within a common georegion. That is, both cameras 410, 412 communicating via the specialized communication port 522 are able to pass control signals and other digital information to assist a correlated object tracking function. Specialized communication ports for inter-camera communications can be continually enabled, where an end-user lacks an option to disable such communications. Cameras 410, 420 are able to communicate, specifics of objects being tracked actively during image capture, object profiles 556, video, sensor information, and other data over the specialized communication ports 522 and/or corresponding channels 450, 452. Specialized communication ports 522 are included for image channel 450 communications in embodiments.

Environmental sensors 524 record external conditions existing in an environment within which the camera 510 is located. Sensors 524 include optical sensor, such as those capturing optical information for specific sensor regions 142-146. Sensors 524 also include position sensors, such as a Global Positioning System (GPS) sensor. In embodiments, sensors 524 include motion sensors, gyroscopic sensors, tilt sensors, accelerometers, directional sensors, thermal sensors, humidity sensors, moisture sensors, and the like. Environmental sensors 524 include microelectromechanical systems (MEMS) sensors. Sensor information communicated via one or more communication ports 522 over command channel 452 between cameras 410, 412.

Capture adjustors 526 are one or more components that perform adjustments affecting content of the image data placed in storage 516. Capture adjustors 526 include optical adjustors, which alter a characteristic of light striking the surface of the image sensor 514. Aperture size, optical zoom, optical focus settings, and the like are functions performed by optical capture adjustment components of camera 510. Capture adjustors 526 also include hardware components providing adjustments to settings affecting a conversion of light striking a surface of the image sensor 514 into electrical signals, and settings for converting the electrical signals into digital data. There is always a loss when converting analog information to digital information. The non-optical capture adjustors are components that make tradeoffs regarding this loss.

The audio transducer 528 converts acoustic waves (sound) into electronic signals. In various embodiments, the audio transducer 528 is an interior (to the camera) microphone, an exterior microphone, or set of ports linking the camera 504 to an external microphone.

Mount 530 is a mechanical component for coupling the camera 510 to a surface. Different mounting structures are contemplated, such as a helmet-mount, a shoulder-mount, a moving vehicle (e.g., car, bicycle, surfboard, etc.) mount, a tripod, a ceiling mount, wall mount, and the like. In some but not all embodiments, the mount 530 enables an electronic coupling over a bus to auxiliary components.

Software/firmware 506 of camera 510 includes, but is not limited to, object identifier 540, direction handler 542, object profiler 544, mode 546, driver/API 548, source shifter 550, security component 552, user interface 554, object profile 556, and the like. Each of these components is a structured component or module having a defined function. These components are specifically designed to execute on an operating system used by camera 510 and/or to be executed by circuitry and hardware 504 of camera 510.

Object identifier 540 is a software/firmware structure designed to determine a position of an object within an image file/data stored by storage 516. The image file/data is a curvilinear one in embodiments. Object identifier 540 utilizes pixel based matching and patterns comparing them to known characteristics (or pixel-based models of an ideal version of the object) in embodiments. Embodiments are contemplated where the object identifier 540 is assisted by a conveyance of external object tracking data. For example, a tracked object (e.g., a football) may have an embedded location detector, which transmits location data conveyed to camera 510 to aid in object location. In other embodiments, a visible marker, such as a high-contrast line, is attached to a tracked object to aid in object identification by identifier 540. In embodiments, the object identifier 540 defines an object position element, which specifies a position of a tracked object within the image data. Object identifier 540 is able to identity more than one object within a single image frame in embodiments. Multi-object tracking facilitates "object jumping" while tracking. For example, if a football and a receiver are both "tracked objects" and object tracking is enabled for the football, tracking can jump to the receiver when the receiver is carrying the football. In other words, sometimes tracked objects are obscured by other dynamic objects in the normal course of their usage. These relationships are defined and the object identifier 540 leverages these relationships when performing its functions. Object profiles 556 define specifics for a tracked object, leverageable by object identifier 540 in embodiments.

Direction handler 542 is a software/firmware structure designed to determine a motion vector for a tracked object. Direction handler 542 generates an object direction, which specifies this motion vector. The motion vector is specified using a two dimensional coordinate system in one embodiment; as image files/data from a single lens inherently lack depth. In other embodiments, the direction handler 542 specifies a motion vector in three dimensions of space and one dimension of time. Directions determined by direction handler 542 are leveraged by object identifier 540 to rapidly locate a consistently moving object given a time sequenced set of image files. That is, a moving object having a known motion vector will have a predicted position. A sampling rate used by object identifier 540 and direction handler 542 varies from object-to-object and may be a setting parameter defined in a respective object profile 556. Combining a motion vector from direction handler 542 and position data from object identifier 540 permits some "false positive" identifications performed by direction handler 542 to be discarded. That is, if a determined object position is inconsistent with an otherwise consistent direction vector, the inconsistent position is discarded; as its position is likely erroneous. False position discards and rules for applying them are defined as a parameter specific to a tracked object within a respective object profile 556. The interoperability of object identifier 540 and direction handler 542 results in a functional combination of the two in some embodiments; the combined structure is referred to herein as an object tracking component, an object tracking structure, or an object tracker.

Object profiler 544 is a software/firmware structure designed to establish parameters for an object profile 556. Object profiler 544 is able to communicate object profiles to and from camera 504 via transceiver 520. In one embodiment, such conveyances occur over command channel 452 using channel dedicated communication ports 522. Object profiler 544 permits manual adjustments to object profiles 556 in embodiments via a user interface. In one embodiment, a heuristic program linked to the object profiler 544 makes adjustments based on learned behavior over time to maximize an effectiveness of a corresponding object profile 556. In such embodiments, object profiler 544 monitors settings of a given profile 556. This information is conveyed to a remote server, which aggregates results from multiple cameras and repetitively optimizes object profiles in a data driven fashion.

Mode 546 refers to an adjustable setting of the camera 510, which includes a setting for an object tracking mode. The camera 510 behavior is modifiable based on mode. Other modes exist, and object tracking functions are disabled in embodiments when the camera is placed in other ones of these modes.

Driver/Application Programming Interface (API) 548 represents interfaces for communicating information to/from camera 510 in a standardized fashion. The driver/API 548 selectively exposes parameters and functions to external devices permitting automated communications, automated response, and remote triggering of camera features. The driver/API 548 permits camera to control and/or adjust playback of an external device when in object tracking playback mode in embodiments. Functions, such as those communicated over command channel 452 or image channel 450 are dependent on interfaces exposed by driver/API 548 in embodiments.

Source shifter 550 is a software/firmware structure designed to alter an image acquisition source when generating video segments for playback. Source shifter 550 handles a source-PassOff (566) situation, such as detailed in FIG. 3C. Multiple different cameras 510 tracking the same object communicate with each other (over channel 452) to ensure coverage of the object within video is optimal.

Security 552 is a software/firmware structure designed to ensure communications to/from camera 510 are secure. Special access is granted by security 552 for inter-camera communications conveyed over channel 452 in embodiments. Security 552 encrypts/decrypts communication channels, data conveyed to/from camera 510, and data/files contained in storage 516 in embodiments. Security 552 also establishes rules for utilizing communication ports 522 and sharing environmental sensor 524 information in embodiments.

User interface 554 is a human to machine interface used to control hardware 504 and software/firmware 506 components. Buttons, switches, LED displays, and other I/O components integrated within camera 510 as hardware are user interface peripherals in embodiments. In other embodiments a primary user interface is a graphical user interface presented on a remote computing device linked to camera 510 via transceiver 520. An application running on a smart phone, a tablet, or within a computer browser is an example artifact within which remote user interfaces for camera 510 reside.

Object profile 556 is a data store providing specific settings for tracking a specific object. Object profile 556 includes a variety of data elements, such as object characteristics 561, image set 562, movement characteristics 563, obscurement characteristics 564, object jump characteristics 565, and source-PassOff characteristics 566. Object characteristics 561 define object physical size, object name, object description, object features, and the like for a profiled object. Image set 562 represents a set of one or more model "images" for an object, which is matched against portions of an image file from an image capture. Movement characteristics 563 represent a set of specifications defining typical movement rates for the profiled objects. Different movement rates are defined based on specific domain specific events. For example, a movement rate of a football can include different events relating to hiking the football, carrying the football, throwing the football, football motion when thrown, kicking a football, and the like. Obscurement characteristics 564 represent a set of anticipated parameters for handling situations when a tracked object is partially or totally obscured. The parameters for obscurement will differ based on situations, as evident from the football example above. Object jump characteristics 565 define situations for a specific object where it is appropriate to track an alternative object in motion in lieu of tracking a discrete object. For example, when a person is carrying a football that person may be easier/more appropriate to track than the smaller object of a football, which is likely highly obscured in such a situation. Source-PassOff characteristics 566 define situations and parameters where coverage of tracking the object is shifted to/from camera 510 to another remote source. The object profile 556 parameter settings presented herein are illustrative and are not intended to be exhausting.

Figure 6:
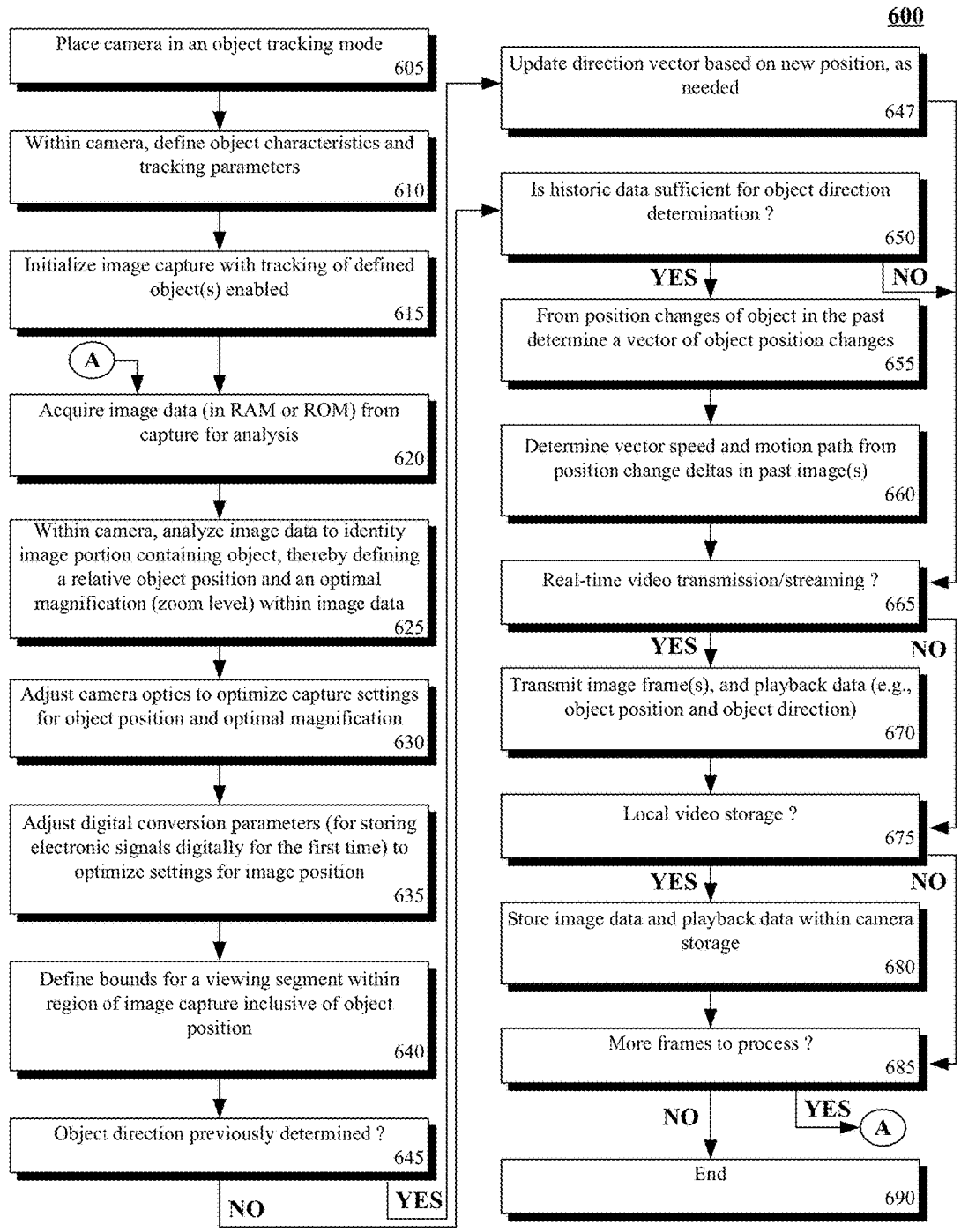
FIG. 6 shows a flow diagram for capturing images within a panoramic video camera with object tracking enabled, in accordance with exemplary embodiments of the disclosure.

FIG. 6 shows a flow diagram 600 for capturing images within a panoramic video camera with object tracking enabled in accordance with embodiments of the invention. The diagram 600 illustrates a process performed by the panoramic video camera 110, 212, 214, 410, 420, and/or 510 in embodiments.

In step 605, a panoramic video camera is placed in an object tracking mode. A camera may have multiple modes, such as a mode that tracks movement of the camera itself and an object tracking mode. A user establishes the object tracking setting via a GUI of a computing device. The user established settings are transmitted over a network to the camera. In another embodiment, tracking mode for the camera can be scheduled in advance for defined events (such as a football game or a soccer game). A time occurrence of the event triggers a conveyance of a command to place the camera in the tracking mode.

In step 610, object characteristics and tracking parameters for a tracked object are defined within the camera. This information is part of an object profile (556) in one embodiment. These characteristics and parameters vary from object-to-object and from event-to-event. For example, image identification characteristics of a football and soccer ball (two different tracked objects) vary significantly from each other. Multiple objects (including a primary and secondary objects) are able to be concurrently tracked in embodiments. Secondary object tracking can help with object obscurement 564 issues, object jumping 565 scenarios, and other such features. Object identification and tracking information/profiles are stored within storage 516 and/or are conveyed over a network. In step 615, image capture is initialized with tracking of defined objects enabled. In step 620, image data (e.g., image files) is acquired within ROM or RAM of the camera.

In step 625, within the camera, the image data is analyzed to identify an image portion containing the one or more tracked objects. This step defines a relative (or absolute) object position within the image data of the tracked object. An optimal magnification is also defined. This magnification is designed to make the detected object more visible for a given situation. For example, in one embodiment, a range of object size can be defined, where a selected magnification is selected to ensure that a size of the object is within the range. Magnification (or zoom level) dynamically changes to ensure the object's overall size is consistently within the established size range. Object position data and zoom level, are each a component of the playback data. Image data (for a specific image frame) is constantly being received, which alters a position of the object from image frame to image frame. The object position data and zoom level is adjusted accordingly over time. A sampling rate for object position data may be disjoint from a video frame rate. A sampling rate for zoom level may be disjoint from an update occurring for object position, which is also disjoint from a video frame rate in embodiments.

In step 630, camera optics are adjusted to optimize capture settings of the panoramic video camera for the object position and/or defined zoom level. For example, aperture, zoom, focus, and other optical settings are able to be adjusted to optimize image content for the tracked object. Optical adjustments refer to adjustments that change the light passing through an ultra-wide lens of the camera to strike a surface of an image sensor.

In step 635, digital conversion parameters of the camera are adjusted to optimize settings for image position. Every time electronic signals are converted into digital information, losses occur. Parameters are established for conversion components, such as FPGAs, which alter the conversion to digital losses per adjustable settings (such as those related to gain, gamma, area of interest, binning/subsampling, pixel clock adjustments, offset, triggering, brightness, contrast, saturation, sharpness, etc.). The adjustable settings will often vary from camera to camera so the enumerated ones are a representative sample and not an exhaustive listing as will be evident to one of ordinary skill. Step 635 is directed to an initial conversion of electronic signals (generated by the image sensor from light striking its surface) into digital information, which is referred to in step 635 as image data. Digital conversion parameters are those affecting an initial loss when storing received signals into a digital domain for the first time. These settings are not post-processing settings. Thus, a "digital zoom" applied at step 635 alters digital content of a raw image, as opposed to altering playback of an unaltered source digital image file.

In step 640, bounds for a viewing segment are defined within a region of image capture. A viewing segment represents a sub-portion (such as 110°) of an overall 360° FOV captured by the camera. At playback time, only a portion of this available FOV is viewable at any point in time. The viewing segment is a viewable region of this arc defined when playing back video/images. This viewing region is subject to change by user input via interactive controls (such as view adjustment 162). The default of an 'object tracking' playback ensures the tracked object (e.g., football of FIG. 2A-3C) is viewable during playback.

In step 645, a determination as to whether object direction has been established previously is made. Object direction requires movement over time, which requires an analysis of a sequence of image frames (where the object is identified in each frame). Thus, a minimum quantity of time-sequential image frames is necessary to determine object direction. Once object direction is initially determined, subsequent object movement can alter this direction over time. For example, a thrown football's direction of motion is a curve initially extending upwards from a force of a throw and eventually moving downwards due to a force of gravity. In step 647, a directional vector of the tracked object is updated as needed based on position changes detected. Object direction and velocity is a factor in determining an optimal magnification centered on an object in embodiments. The continuously nature of this process is represented by a loop from step 647 to step 665. Before an initial direction is determined, a sufficient number of frames are needed, as represented by step 650. When insufficient data exists, the initial object direction determination is deferred, represented by looping from step 650 to step 665.

When there is sufficient information, a position change of the object is determined based on post positions of the object within image frames, as shown by step 655. This may leverage an object position element. It should be appreciated that by nature, a camera with a single ultra-wide lens is unable to determine depth. Depth generally requires stereoscopic vision (multiple cameras with overlapping fields of view) and/or sensors; such as laser distance finders that explicitly determine distance. Thus, the object direction is a two-dimensional direction (based on pixel mapped changes) in one embodiment. In another embodiment, multiple cameras (e.g., cameras 410 and 420) intercommunicate. Each of these cameras may include a camera position tracking sensor, such as a GPS component. An aggregation of video from multiple cameras can be used to determine a depth through triangulation. That is, a size of an object is assumed to be a constant. Perspective views from different cameras having known position provide a three dimensional coordinate system for an object vector. Having a three dimensional object direction is highly beneficial in changing playback perspective based on object motion; such as changing from a first person perspective to a third person perspective during playback. A tracking of multiple objects within a capture region, each having a determined depth further facilitates adjustments to playback perception, which is contemplated in embodiments. Regardless of implementation specifics, vector speed and motion path is determined in step 660.

Some embodiments of the three sixty degree camera transmit real-time video, others store images/video locally, others do both. Real-time video refers to video able to be captured and replayed within a permissibly low time period for a viewer to consider the video playback live. Near real-time includes buffering delays. Thus, near real-time represents playback within fifteen seconds or less from a time the real-world activity took place. In one embodiment, real-time can refer to an imperceptible time from a viewer perspective between playback and capture, which is under one second, and typically less than half of a second. When real time video transmission or streaming is enabled (step 665), image frames, image data elements (for object position), and image direction data (for an object movement vector) are conveyed over a network to a playback device as shown by step 670. The transmission can be direct from camera to playback device over a LAN or PAN, or may occur through an intermediary such as a video server 430 depending on implementation specifics. If local video storage occurs (within storage 516 of the camera), image data, the object position element for specific frames of image data, the object direction data for specific frames of image data, and the like are recorded in the internal storage, as shown by steps 675 and 680. A variety of video formats and/or image storage formats are able to be used when storing image files and/or video segment files, and the disclosure is not limited in this regard. When there are no more frames to process (in step 685) recording stops. The process ends, as shown by step 690. Otherwise, the process continues to loop, as shown by proceeding from step 685 to step 620.

Figure 7:
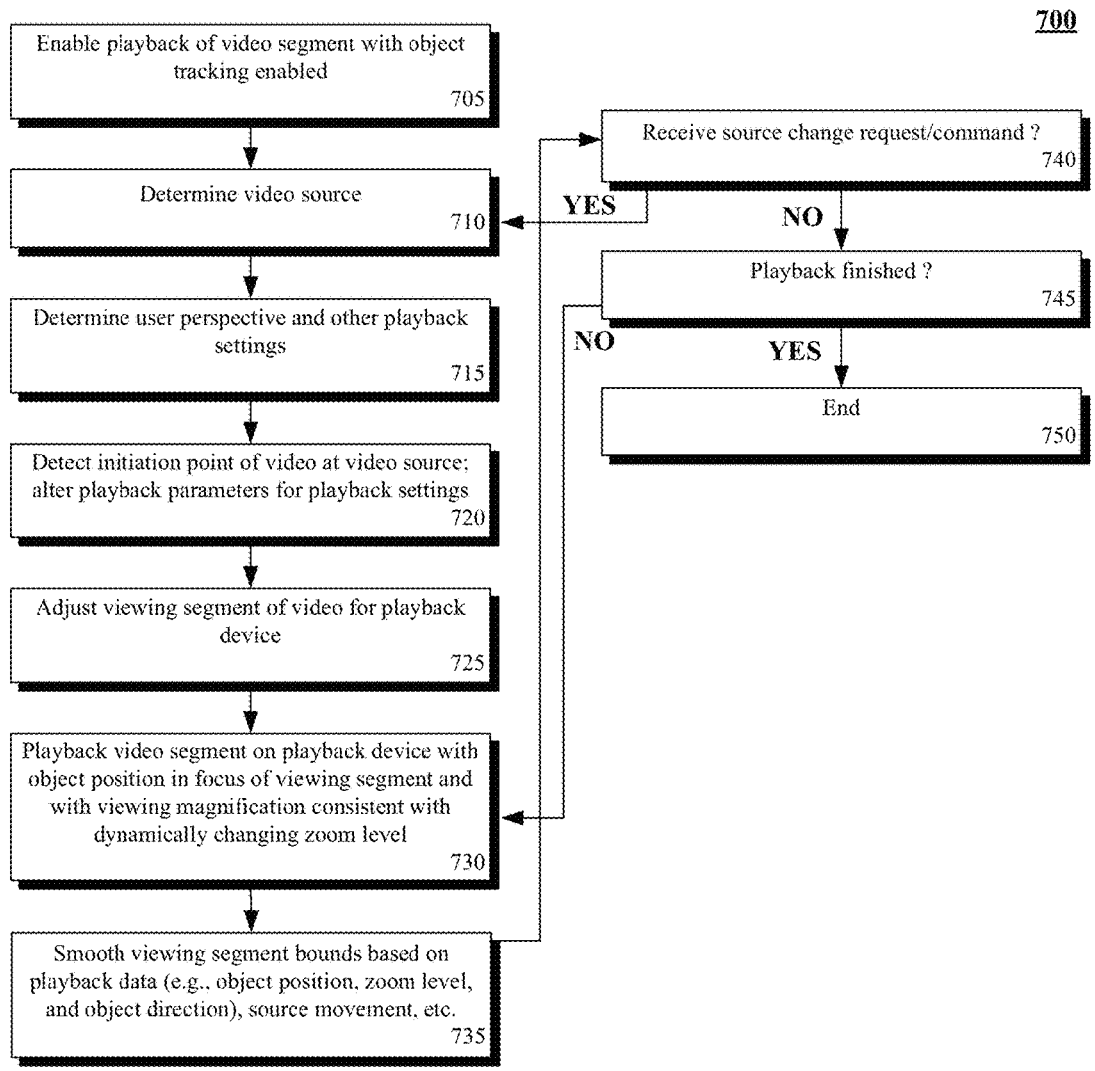
FIG. 7 shows a flow diagram for playback of video captured by a panoramic video camera with object tracking enabled, in accordance with exemplary embodiments of the disclosure.

FIG. 7 shows a flow diagram 700 for playback of video captured by a panoramic video camera with object tracking enabled in accordance with embodiments of the invention. The diagram 700 illustrates a process performed by panoramic video camera 110, 212, 214, 410, 420, and/or 510 in embodiments.

In step 705, playback is enabled as is object tracking. The video segment is one obtained from image data captured by a panoramic video camera. Values for object position elements and object direction elements are referenced to specific portions of the video segment in embodiments. In step 710, a video source for the playback is determined. The video source may be a file, a data location managed by video server 430, or may be a direct feed from a camera 410. In embodiments, playback represents real-time streaming of the captured content. During playback, sources are shifted, as noted by item 740, and as illustrated in the use case of FIG. 3C. As illustrated in FIG. 7, source shifting can be initiated by the playback device responsive to received command(s)/request, which is one contemplated implementation. In one alternative embodiment, each camera (e.g., 410, 420) receives video from a remote source and internally conveys a stream from multiple sources (satisfying the use case of FIG. 3C). Thus, the source-shifting burden is placed on internal camera components. In another alternative, a software proxy for a network endpoint is imposed, which performs the source switching during playback. The proxy alters endpoint information, thus changing the source without any alteration of a communication channel being experienced from the playback device's perspective. Such a proxy function is implemented within the panoramic video camera 410, within the video server 430, or within an intermediate network 460 node in contemplated embodiments.

In step 715, a user perspective for playback and other playback settings are determined. These settings are default ones, user entered ones, or ones defined in a data store. Playback settings recorded in object profiles 556 are used by a playback device. In step 720, an initiation point (start time) is determined for the video segment. Playback parameters are established consistent with the playback settings.

In one embodiment, a viewing frame for playback is defined by the panoramic video camera or other source before being conveyed to the playback device. In another embodiment, the playback device itself defines the viewing frame when in object tracking playback mode. This is facilitated by having defined object position data and object direction data. The viewing frame is also altered/defined by a zoom level or a level of magnification, which changes the bounds (e.g., perimeter) of the viewing frame and its total area. The playback device may alter previously established viewing segment boundaries for an improved user experience, for consistency with hardware parameters of playback, and/or for consistency with playback settings. In step 725, the viewing segment (bound frame that is seen during playback) is adjusted. This adjustment ensure that the object position is viewable or in focus within the viewing segment, as noted by step 730. The adjustment also dynamically modifies a magnification or zoom level. In step 735, a smoothing operation is implemented for playback, which adjusts viewing segment boundaries. For example, if there is significant camera motion, the boundaries of the viewing segment are adjusted to 'stabilize" the playback.

In step 740, the playback device receives a request/command to change the source. The request may come from an interactive user interface in one embodiment, which represents a user selecting a different camera from a multi-camera selectable interface. In another embodiment, the source chance is not manually determined. It results from an automatic "pass-off" between sources, such as a set of cameras concurrently tracking a common object. If there is a source change, the process loops from step 740 to step 710. Otherwise, step 745 determines whether playback is to be terminated. If not, the process loops to step 730. Otherwise, the playback process ends at step 750.

Figure 8:
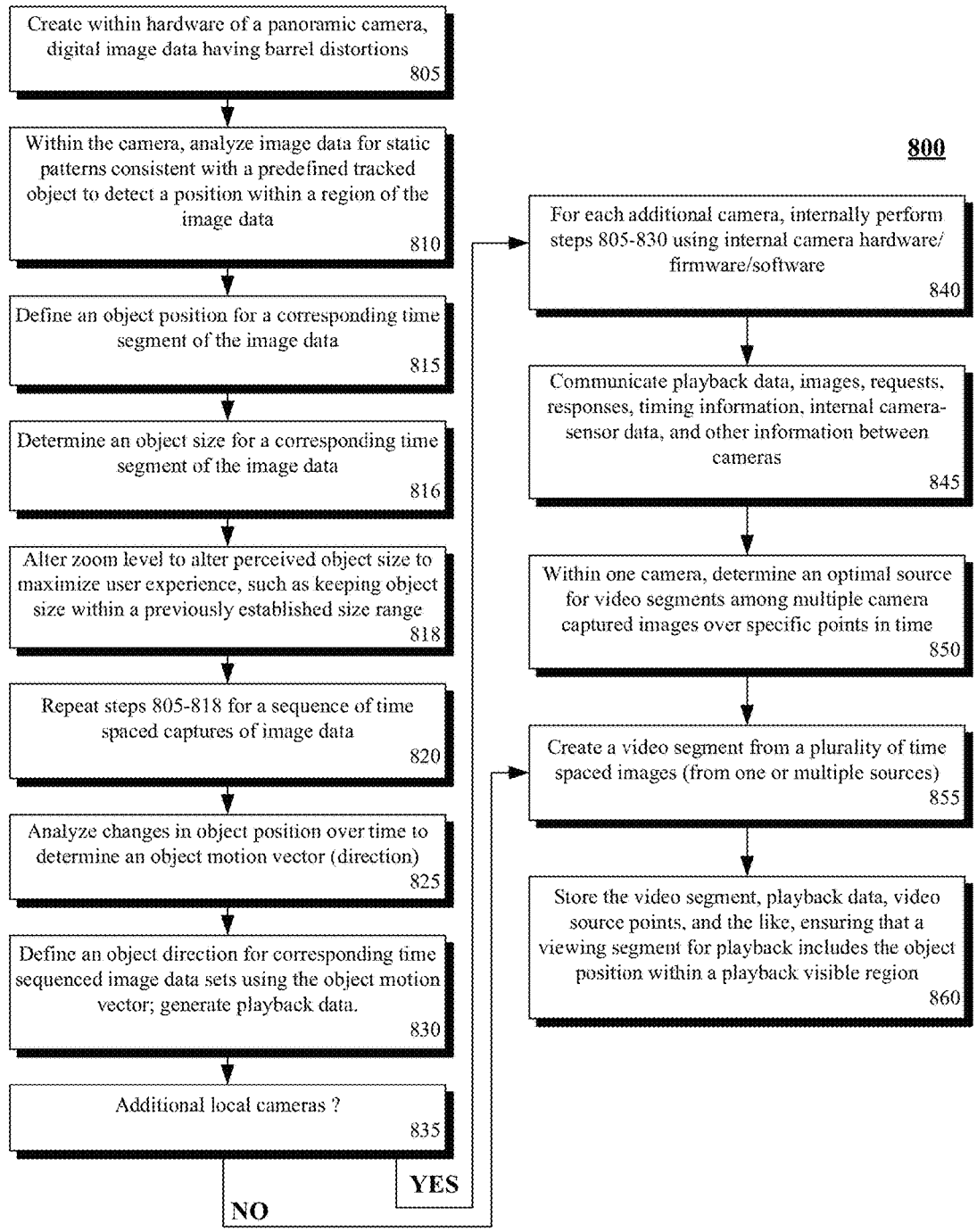
FIG. 8 shows a flow diagram for image capture with object tracking that involves multiple panoramic video cameras, in accordance with additional exemplary embodiments of the disclosure.

FIG. 8 shows a flow diagram 800 for image capture with object tracking that involves multiple panoramic video cameras in accordance with embodiments of the invention. The diagram 800 illustrates a process performed by panoramic video camera 110, 212, 214, 410, 420, and/or 510 in embodiments.

In step 805, hardware of a panoramic video camera creates digital image data. The digital image data is stored in an image file, in a persistent memory, or within a random access memory (RAM). Information conveyed to a target playback source from the panoramic video camera can be placed in a standardized file format before conveyance. The digital image data of step 805 includes image content subject to curvilinear barrel distortions, resulting from passing light through an ultra-wide lens.

In step 815, the image data is analyzed within the camera's hardware/circuitry to detect patterns consistent with those of a predefined tracked object. The predefined fields are those stored in an object profile 556 in one embodiment. The patterns include static and dynamic ones. Pixel comparisons between a set of characteristic image patterns for the object and the image content are used for object detection. The object position element is referenced to a corresponding time segment of the image data. In step 816, an object size is determined for a specific time segment of the image content. The size of the object is used to determine whether a magnification (e.g., zoom level) is to be applied to alter the "default" object size. In one embodiment, a size range is definable, where the magnification is applied to alter the size of the object to ensure it is within the size range, as shown by step 818. Steps 805-818 are repeated within the camera for a sequence of time spaced images, as noted by step 820.

Once a set of images is obtained, changes in object position (and object size) over time are used to determine a motion vector for the object, as shown by step 825. The motion vector affects a desired zoom level in one embodiment. In embodiments, the motion vector is one relative to a region of the curvilinear image data. In other embodiments, the motion vector is adjusted to correspond to a three dimensional space from which the image data is obtained. To determine depth for the motion vector, triangulation principles are used in conjunction with a set of additional lenses. Distance finders are also contemplated, which obtain quantified data of object distance for use in object motion vector determination. An object direction element is defined for a corresponding time sequence of image data sets, as shown by step 830.

The process 800 is conducted by a single panoramic video camera in one embodiment; and a set of intercommunicating panoramic video camera in another. In step 835 a determination as to whether additional local panoramic video cameras are tracking a common object. If so, for each additional camera steps 805-839 are able to be concurrently performed using internal camera hardware, firmware, and/or software, as shown by step 840. In step 845, object position data, object direction data, images, requests, responses, timing information, internal camera sensor data, and other information is communicated between cameras. This information is conveyed over command channel 452, image channel 450, or other communication pathway. Within hardware of the original camera, which has been conveyed information from other cameras per step 845, a determination of an optimal source for video segments is made. The optimal source considers numerous factors, such as a visibility of the tracked object, a degree to which one source is superior to another, a computed cost or penalty assigned for shifting sources (to minimize excessive source shifting), and the like. These numerous factors are quantified and considered in embodiments of step 860.

In step 855, a video segment is created from a plurality of time spaced images. These images are from one or more cameras. In step 860, the video segment created in step 855 is stored along with corresponding object data elements, object direction elements, video source points, and other information. This information ensures that a viewing segment used for playback includes the object position (shows the object being tracked) within a visible playback region.

The present disclosure establishes an adaptive zoom for a panoramic video camera, which is focused on an object within a playback frame. The zoom is able to be applied to camera settings, which include both optical and digital ones. Conventional panoramic video cameras only perform post-processed zoom functions, which result in content loss over use of camera specific settings. No know panoramic video cameras track moving objects (other than movement of the camera itself) within their FOV. The disclosure not only tracks objects, but applies a magnification to ensure effective viewing of the object. The application of the magnification (or zoom level) is a non-manual adjustment performed automatically by a processor. The adjustment may be an intra-camera one, may be performed by a playback device, or both. Object tracking in a three-hundred and sixty degree context is different from object recognition performed for a narrow angled image; as a breadth of coverage of a 360° image has unique challenges. For example, even though a 360° video includes a wide arc/FOV, playback is restricted to viewing a smaller FOV. Adjusting the viewing segment for an area of interest manually is frustrating, time intensive, and impractical in many circumstance.

Conventional teachings rely on a direction of camera motion to "center" object capture and playback. While this is fine in many instances, it is highly restrictive in others. For example, in a football game, where players wear panoramic video cameras, each player's motion is not generally of "highest interest" to a viewer. Instead, a viewer is often most interested in the "action", which is centered on a football and its position/motion. This problem has not been recognized in the field or discussed in publications. Solutions for object tracking are challenging given unique constraints in this space, such as a need for real-time video playback. Inherent distortions resulting from use of an ultra-wide angle lens for image capture also is a factor increasing the inherent challenge level. These disclosure defined challenges have not been overcome conventionally.

The diagrams in the figures illustrate the architecture, functionality, and operation of possible implementations of systems and methods according to various embodiments of the present invention. It will also be noted that each block of the block diagrams and combinations of blocks in the block diagrams can be implemented by special purpose hardware-based systems that perform the specified functions or acts, or combinations of special purpose hardware and computer instructions.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices"), such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., including a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description as part of the original disclosure, and remain so even if cancelled from the claims during prosecution of the application, with each claim standing on its own as a separately claimed subject matter. Furthermore, subject matter not shown should not be assumed to be necessarily present, and that in some instances it may become necessary to define the claims by use of negative limitations, which are supported herein by merely not showing the subject matter disclaimed in such negative limitations.

What is claimed is:

1. A panoramic video camera comprising:
   a lens having a field of view (FOV) that includes a horizontal FOV portion and a vertical FOV portion, the horizontal FOV portion being three hundred sixty degrees about an optical axis of the lens;
   an image sensor positioned in light-receiving relation to the lens and operable to convert light passing through the lens into electronic signals representative of at least a portion of an image within the FOV of the lens;
   a storage medium operable to store digital image files constructed from the electronic signals, wherein each of the digital image files includes a panoramic image and is time sequenced; and
   a processor operably coupled to the storage medium and operable in accordance with executed programmatic instructions to:
      analyze the digital image files to locate an object and positions thereof within panoramic images of the digital image files to produce object position data; and
      generate a plurality of zoom levels for the respective digital image files based on the object position data, wherein the zoom levels enable a playback device to visually show the object at varying magnifications during playback of a video segment derived from the digital image files; and
   digital zoom components that reactively adjust settings that convert electronic signals produced by the image sensors into digital data in accordance with the zoom level changes to minimize analog-to-digital information loss within the respective digital image files.

2. The panoramic video camera of claim 1, further comprising:
   optical zoom components that optically adjust light passing through the lens and striking the surface of the image sensor, wherein the optical zoom components are reactively adjusted as the zoom levels change.

3. The panoramic video camera of claim 1, wherein executed programmatic instructions further:
   generate the video segment from the digital image files while applying the plurality of zoom levels.

4. The panoramic video camera of claim 1, wherein executed programmatic instructions further:
   maintain, via the reactive adjustments of the zoom level, a magnification of the object within an established object size range.

5. The panoramic video camera of claim 1, wherein the zoom levels and the object position data enables the playback device to adaptively zoom the images displayed during playback of the video segment such that the object is viewable within each displayed image frame of the video segment and such that the object as viewable is zoomed to emphasize the object during playback.

6. The panoramic video camera of claim 1, wherein the digital image files are curvilinear image files subject to barrel distortions due to optical properties of the lens, which distorts light striking a surface of the image sensor, wherein the executed programmatic instructions to analyze the digital image files analyze the curvilinear images to locate the object and positions thereof.

7. The panoramic video camera of claim 6, wherein the executed programmatic instructions analyze pixels of the curvilinear image files and mathematically adjust for the barrel distortions to produce the object position data and to provide the zoom levels.

8. The panoramic video of claim 1, wherein the executed programmatic instructions further:
   define within playback data a viewing segment for the video segment, wherein the viewing segment is a sub-region of the horizontal FOV portion, said sub-region being one hundred and eighty degrees less, wherein the viewing segment is a portion of image content viewable within the playback device at a time that playback of the video segment occurs, wherein the viewing segment comprises the located object and positions thereof as adjusted per the zoom levels.

9. The panoramic video of claim 1, wherein the executed programmatic instructions further:
   define within playback data a viewing segment for the video segment, reactively adjusting boundaries of the viewing segment to change an area of the viewing segment based on the zoom levels, which adjusts the magnifications of the object during playback, as playback is defined by the boundaries of the viewing segment.

10. A system for capturing and displaying panoramic video, the system comprising:
   a panoramic video camera that includes:
      a lens having a field of view (FOV) that includes a horizontal FOV portion and a vertical FOV portion, the horizontal FOV portion being three hundred sixty degrees about an optical axis of the lens;
      an image sensor positioned in light-receiving relation to the lens and operable to convert light passing through the lens into electronic signals representative of at least a portion of an image within the FOV of the lens;
      a storage medium operable to store digital image files constructed from the electronic signals, wherein each of the digital image files includes a panoramic image and is time sequenced;
      a first processor operably coupled to the storage medium and operable in accordance with executed programmatic instructions to:
         analyze the digital image files to locate an object and positions thereof within panoramic images of the digital image files to produce object position data;
         generate a plurality of zoom levels for the respective digital image files based on the object position data, wherein the zoom levels enable a playback device to visually show the object at varying magnifications during playback of a video segment derived from the digital image files, wherein playback data comprises the object position data and the zoom levels;
         generate playback data based on the object position data and the zoom levels; and
   a video playback device that includes:
      a receiver operable to receive the playback data and the digital images files from the network;
      a display operable to display images of a video segment; and
      a second processor operably coupled to the receiver and the display, and operable in accordance with executed programmatic instructions to generate the video segment from the digital image files such that the images of the video segment are adaptively oriented and adaptively magnified based on the playback data.

11. The system of claim 10, wherein the second processor executes programmatic instructions to further:
   maintain, via the reactive adjustments of the zoom levels, a magnification of the object within an established object size range.

12. The system of claim 10, wherein the second processor executes programmatic instructions to further:
   reactively adjusting boundaries of a viewing segment of the video segment to change an area of the viewing segment based on the zoom levels, which adjusts the magnifications of the object during playback, as playback is defined by the boundaries of the viewing segment.

13. The system of claim 10, wherein the panoramic video camera further comprises:
   optical zoom components that optically adjust light passing through the lens and striking the surface of the image sensor, wherein the optical zoom components are reactively adjusted as the zoom levels change.

14. The system of claim 10, wherein the panoramic video camera further comprises:
   digital zoom components that reactively adjust settings that convert electronic signals produced by the image sensors into digital data in accordance with the zoom level changes to minimize analog-to-digital information loss within the respective digital image files.

15. A panoramic video playback device comprising:
   a receiver operable to receive playback data and digital images files from a network, the playback data identifying time-varying positions and zoom-levels for an object within panoramic images of the digital image files;
   a display operable to display images of a video segment; and
   a processor operably coupled to the receiver and the display, and operable in accordance with executed programmatic instructions to generate the video segment from the digital image files such that the images of the video segment are adaptively oriented and adaptively magnified based on the playback data, wherein the processor executes programmatic instructions to further:
      determine a resolution of a screen of the playback device; and
      establish constraints on the zoom levels applied by the processor based on constraints of the resolution to minimize pixilation from over magnification.

16. The panoramic video playback device of claim 15, wherein the processor executes programmatic instructions to further:
   maintain, via the reactive adjustments of the zoom levels, a magnification of the object within an established object size range.

17. The panoramic video playback device of claim 15, wherein the processor executes programmatic instructions to further:
reactively adjusting boundaries of the viewing segment of the video segment to change an area of the viewing segment based on the zoom levels, which adjusts the magnifications of the object during playback, as playback is defined by the boundaries of the viewing segment.

18. The panoramic video playback device of claim 15, wherein the video segment comprises a first sequence of image frames from a first file of the digital image files received from a first panoramic video camera, wherein the video segment comprises a second sequence of image frames from a second file of the digital image files received from a second panoramic video camera, wherein the video segment is a continuous time sequence of image frames comprising the first sequence and the second sequence.

* * * * *